(12) United States Patent
Berkbuegler (10) Patent No.: US 11,234,433 B2
(45) Date of Patent: Feb. 1, 2022

(54) TREE STAND AND SECUREMENT MECHANISM

(71) Applicant: Ronald Berkbuegler, Troy, IL (US)

(72) Inventor: Ronald Berkbuegler, Troy, IL (US)

( * ) Notice: Subject to any disclaimer, the term of this patent is extended or adjusted under 35 U.S.C. 154(b) by 63 days.

(21) Appl. No.: 16/402,850

(22) Filed: May 3, 2019

(65) Prior Publication Data

US 2020/0344997 A1 Nov. 5, 2020

(51) Int. Cl.
*A01M 31/02* (2006.01)

(52) U.S. Cl.
CPC .................................. *A01M 31/02* (2013.01)

(58) Field of Classification Search
CPC ..................................................... A01M 31/02
See application file for complete search history.

(56) References Cited

U.S. PATENT DOCUMENTS

| | | |
|---|---|---|
| 1,522,292 A | 1/1925 | Enssle |
| 1,658,191 A | 2/1928 | Gravning |
| 1,964,067 A | 6/1934 | Leach |
| 2,232,414 A | 2/1941 | Swann |
| 2,775,489 A | 12/1956 | Hagadorn |
| 2,778,556 A | 1/1957 | Johnson |
| 3,336,999 A | 8/1967 | McSwain |
| 3,902,700 A | 9/1975 | Cox |
| 4,090,587 A | 5/1978 | Pyle |
| 4,467,890 A | 8/1984 | McCallum et al. |
| 4,469,195 A | 9/1984 | Sartain |
| 4,483,416 A | 11/1984 | Garcia |
| 4,579,198 A | 4/1986 | Lee |
| 4,742,888 A | 5/1988 | Amacker |
| 4,946,004 A | 8/1990 | Henson |
| 4,995,475 A | 2/1991 | Berkbuegler |
| 4,995,476 A | 2/1991 | Buck |
| 5,109,954 A | 5/1992 | Skyba |
| 5,279,390 A | 1/1994 | Phillips |
| 5,332,063 A | 7/1994 | Amacker |

(Continued)

FOREIGN PATENT DOCUMENTS

FR 2622630 A1 5/1989

OTHER PUBLICATIONS

X-STAND Treestands; Jaws of a Shark Grip of a Gator safety sheet, published no later than Sep. 15, 2015.

*Primary Examiner* — Alvin C Chin-Shue
(74) *Attorney, Agent, or Firm* — Young Basile Hanlon & MacFarlane, P.C.

(57) ABSTRACT

A tree stand is disclosed for use in supporting an occupant in an elevated position in a tree. The tree stand includes: a ladder assembly; a support structure secured to the ladder assembly; a jaw assembly; a strap assembly; and an anchor that is securable to the tree. The jaw assembly includes first and second jaws, and is pivotally secured to the support structure such that the jaws are inwardly movable to close the jaw assembly. The strap assembly includes a first strap that extends from the support structure into contact with the first jaw, and a second strap that extends from the support structure into contact with the second jaw. The strap assembly is connectable to the anchor such that the straps are arranged in overlapping, crosswise relation behind the tree, whereby a tensioning force applied to the strap assembly forces the jaws inwardly towards the tree.

18 Claims, 7 Drawing Sheets

(56) References Cited

U.S. PATENT DOCUMENTS

| | | | |
|---|---|---|---|
| 5,368,127 A * | 11/1994 | Phillips | A01M 31/02 182/100 |
| 5,388,664 A * | 2/1995 | Bator | A01M 31/02 182/100 |
| 5,460,240 A | 10/1995 | Jones | |
| 5,590,738 A | 1/1997 | Hunt et al. | |
| 5,590,739 A | 1/1997 | High et al. | |
| 5,638,916 A | 6/1997 | Schneider | |
| 5,791,436 A | 8/1998 | Talley, Sr. | |
| 5,890,560 A | 4/1999 | Sloop | |
| 6,053,278 A * | 4/2000 | Myers | A01M 31/02 182/116 |
| 6,053,284 A | 4/2000 | Fountain | |
| 6,089,350 A | 7/2000 | Hankins | |
| 6,199,660 B1 | 3/2001 | Meeks | |
| 6,715,585 B1 | 4/2004 | Overbaugh | |
| 6,722,472 B2 | 4/2004 | Berkbuegler | |
| 6,799,659 B2 | 10/2004 | Berkbuegler | |
| 7,021,423 B1 * | 4/2006 | Pestrue | A01M 31/02 182/116 |
| 7,458,563 B1 | 12/2008 | Liu | |
| 7,802,653 B2 | 9/2010 | Louk et al. | |
| 7,963,368 B2 | 6/2011 | Scudera et al. | |
| 8,011,476 B1 * | 9/2011 | Alcon | E06C 1/36 182/206 |
| 8,122,998 B2 | 2/2012 | Liles | |
| 8,424,642 B2 | 4/2013 | Lietz | |
| 8,695,761 B1 | 4/2014 | Berkbuegler | |
| 8,794,323 B2 | 8/2014 | Luce et al. | |
| 8,794,383 B2 * | 8/2014 | Furseth | A01M 31/02 182/187 |
| 8,807,278 B1 | 8/2014 | Galloway et al. | |
| 8,997,932 B1 | 4/2015 | Ochoa | |
| 9,038,778 B1 | 5/2015 | Carter et al. | |
| 9,057,202 B2 | 6/2015 | Berkbuegler | |
| 9,068,395 B1 | 6/2015 | Green | |
| 9,073,734 B1 | 7/2015 | Cates et al. | |
| 9,089,125 B1 | 7/2015 | Fast | |
| 9,326,500 B2 | 5/2016 | Overbaugh | |
| 9,332,748 B2 | 5/2016 | Brown | |
| 9,771,756 B1 | 9/2017 | Gregoire | |
| 10,010,068 B2 | 7/2018 | Berkbuegler | |
| 2002/0134620 A1 | 9/2002 | Meyer | |
| 2003/0192741 A1 | 10/2003 | Berkbuegler | |
| 2004/0216952 A1 | 11/2004 | Woller | |
| 2004/0216955 A1 | 11/2004 | Unger | |
| 2005/0145436 A1 * | 7/2005 | Prejean | A01M 31/02 182/136 |
| 2005/0178615 A1 | 8/2005 | Woller et al. | |
| 2007/0000726 A1 | 1/2007 | Berkbuegler | |
| 2008/0105490 A1 * | 5/2008 | Butcher | E06C 1/10 182/116 |
| 2008/0128204 A1 * | 6/2008 | Engstrom | E06C 1/34 182/116 |
| 2008/0142299 A1 | 6/2008 | Berkbuegler | |
| 2008/0210916 A1 | 9/2008 | Berkbuegler | |
| 2009/0223742 A1 | 9/2009 | LePage | |
| 2009/0229916 A1 | 9/2009 | Berkbuegler | |
| 2009/0229917 A1 * | 9/2009 | Berkbuegler | A01M 31/02 182/113 |
| 2009/0242328 A1 | 10/2009 | Cabrera et al. | |
| 2010/0001803 A1 | 1/2010 | Ramirez Munoz | |
| 2010/0018803 A1 | 1/2010 | Schwenke et al. | |
| 2010/0089700 A1 | 4/2010 | Scudera et al. | |
| 2011/0291062 A1 | 12/2011 | Lukes | |
| 2012/0080266 A1 | 4/2012 | Brock | |
| 2012/0097481 A1 | 4/2012 | Schienke et al. | |
| 2013/0327908 A1 | 12/2013 | Brown | |
| 2014/0166400 A1 | 6/2014 | Berkbuegler | |
| 2014/0182969 A1 * | 7/2014 | Overbaugh | A01M 31/02 182/116 |
| 2015/0047924 A1 | 2/2015 | Graham, Sr. | |
| 2016/0153234 A1 | 6/2016 | Mazanek | |
| 2016/0227761 A1 | 8/2016 | Overbaugh | |
| 2017/0142959 A1 * | 5/2017 | Berkbuegler | A01M 31/02 |
| 2018/0027800 A1 | 2/2018 | Dyer | |
| 2018/0066474 A1 | 3/2018 | Johansson | |
| 2019/0281812 A1 * | 9/2019 | Lee | E06C 7/16 |

\* cited by examiner

TREE STAND AND SECUREMENT MECHANISM

TECHNICAL FIELD

The present disclosure generally relates to ladder supported tree stands (e.g., for hunters), and more specifically, to mechanisms for securing a ladder tree stand to a tree.

BACKGROUND

Hunters frequently use tree stands with elevated platforms to observe and hunt wildlife. In ladder supported tree stands, the platform is connected to a ladder assembly that allows the user to access the platform once elevated, wherein the ladder assembly supports the platform in the elevated position.

In general, ladder tree stands are positioned by leaning the tree stand into engagement with a tree so as to orient the ladder assembly in a generally upright position. With conventional ladder tree stands, the user generally climbs the ladder assembly to reach the platform before securing the upper end of the tree stand to the tree. As such, the tree stand is generally unsupported against the tree when the user is climbing the ladder assembly, other than by the force or weight of the tree stand leaning against the tree, which may create the potential for injury should the tree stand move inadvertently.

To address this concern, various mechanisms have been developed to secure the tree stand to the tree, many of which include repositionable jaws that are used to grip the tree. In such designs, however, the tree stand is sometimes caused to move during closure or tightening of the jaws against the tree, which can lead to instability. The present disclosure combats this issue by redirecting the force applied to the jaws during closure to increase the stability of the tree stand.

SUMMARY

In one aspect of the present disclosure, a tree stand is disclosed for use in supporting an occupant (user) in an elevated position in a tree. The tree stand includes: a ladder assembly; a support structure secured to the ladder assembly that is configured to support the occupant of the tree stand; a jaw assembly; a strap assembly including first and second straps; and an anchor that is securable to the tree. The jaw assembly includes first and second jaws, and is pivotally secured to the support structure such that each of the first and second jaws is inwardly movable to close the jaw assembly. The first strap extends from the support structure into contact with the first jaw, and the second strap extends from the support structure into contact with the second jaw. The strap assembly is connectable to the anchor such that the first and second straps are arranged in overlapping, crosswise relation behind the tree (opposite the support structure), whereby a tensioning force applied to the strap assembly forces the first and second jaws inwardly towards the tree.

In certain embodiments, the support structure may include a platform, and a seat that is supported by (e.g., mounted on) the platform.

In certain embodiments, the first jaw may include a first strap routing member that is configured to receive the first strap such that the first strap extends from the support structure through the first strap routing member, and the second jaw may include a second strap routing member that is configured to receive the second strap such that the second strap extends from the support structure through the second strap routing member.

In certain embodiments, the first strap routing member may be configured to receive the first strap such that the first strap is in direct contact with an outer (external) surface of the first jaw, and the second strap routing member may be configured to receive the second strap such that the second strap is in direct contact with an outer (external) surface of the second jaw.

In certain embodiments, the first and second jaws may each include a first linear segment that is pivotally secured to the support structure, and a second linear segment that extends transversely in relation to the first linear segment. In such embodiments, the first strap routing member may be fixedly secured to the first linear segment of the first jaw, and the second strap routing member may be fixedly secured to the first linear segment of the second jaw.

In certain embodiments, the first and second jaws may each include an arcuate segment that extends between the first and second linear segments.

In certain embodiments, the first and second jaws may each be unitary in construction.

In certain embodiments, the tree stand may further include a standoff bracket that is configured to support the ladder assembly to inhibit bowing of the ladder assembly towards the tree under a load (e.g., the weight of the occupant(s)).

In certain embodiments, the standoff bracket may include a first end that is configured for engagement with the ladder assembly, and a second end that is configured for engagement with the tree.

In certain embodiments, the anchor may be configured for engagement with the standoff bracket.

In certain embodiments, the anchor may be configured as a strap that is extendable from the second end of the standoff bracket such that the anchor is circumscribable about the tree.

In another aspect of the present disclosure, a tree stand is disclosed that includes: a ladder assembly; a support structure secured to the ladder assembly that is configured to support an occupant in an elevated position in a tree; a strap assembly with first and second straps that are secured to the support structure; a jaw assembly with first and second jaws that are pivotally secured to the support structure; and an anchor that is securable to the tree. The strap assembly extends between the support structure and the anchor such that the first and second straps are free from engagement with the ladder assembly.

In certain embodiments, the first and second straps may be arrangeable in overlapping, crosswise relation behind the tree (opposite the support structure) such that, upon the application of a tensioning force to the strap assembly, the strap assembly pushes the first and second jaws inwardly towards the tree.

In certain embodiments, the first jaw may include a first strap routing member that is configured to receive the first strap such that the first strap is in direct contact with the first jaw, and the second jaw may include a second strap routing member that is configured to receive the second strap such that the second strap is in direct contact with the second jaw. In such embodiments, the first and second straps may be movable in relation to the first and second jaws upon application of the tensioning force.

In certain embodiments, the first strap routing member may be configured to receive the first strap such that the first strap is in contact with an outer (external) surface of the first jaw, and the second strap routing member may be configured to receive the second strap such that the second strap is in contact with an outer (external) surface of the second jaw.

In certain embodiments, the first and second jaws may each be unitary in construction.

In certain embodiments, the tree stand may further include a standoff bracket that is configured to support the ladder assembly to inhibit bowing of the ladder assembly towards the tree under a load (e.g., the weight of the occupant(s)).

In certain embodiments, the anchor may be configured for engagement with the standoff bracket.

In another aspect of the present disclosure, a method is disclosed for securing a tree stand including a ladder assembly to a tree. The method includes: arranging first and second straps in overlapping, crosswise relation behind the tree, wherein the first and second straps are connected to a support structure that is secured to the ladder assembly and is configured to support an occupant in an elevated position in the tree; connecting the first and second straps to an anchor secured to the tree such that the first and second straps are free from contact with the ladder assembly; and applying tension to the first and second straps such that the first and second straps close a jaw assembly upon the tree.

In certain embodiments, the method may further include passing the first strap through a first routing member on a first jaw of the jaw assembly such that the first strap is in direct contact with the first jaw, and passing the second strap through a second routing member on a second jaw of the jaw assembly such that the second strap is in direct contact with the second jaw. In such embodiments, the first and second straps may apply an inwardly directed force to outer (external) surfaces of the first and second jaws upon the application of tension to the first and second straps.

In certain embodiments, the method may further include securing the anchor to a standoff bracket that extends between the ladder assembly and the tree.

BRIEF DESCRIPTION OF THE DRAWINGS

The disclosure is best understood from the following detailed description when read in conjunction with the accompanying drawings. It is emphasized that, according to common practice, the various features of the drawings may not be to scale, and that the dimensions of the various features may be arbitrarily expanded or reduced for clarity.

DETAILED DESCRIPTION

The present disclosure describes a ladder tree stand for use in supporting one or more occupants (users) in an elevated position in a tree. The ladder tree stand includes: a ladder assembly; a support structure (e.g., a platform, a seat, etc.) that is secured to the ladder assembly and is configured to support the occupant(s) of the tree stand; a jaw assembly with first and second jaws; a strap assembly that is used to close the jaw assembly; and an anchor that is securable to the tree. The strap assembly includes first and second straps that each extend from the support structure, into contact with the jaw assembly, to the anchor. More specifically, the straps extend through routing members on the jaws and are arranged in overlapping, crosswise relation behind the tree (opposite the support structure). The crosswise orientation of the straps allows the jaws to be drawn or squeezed inwardly (rather than pulled) as tension is applied to the strap assembly, thereby increasing the overall stability of the system. For example, in certain known designs, the strap assembly engages (or otherwise contacts) the ladder assembly, which results in the application of force to the ladder assembly as tension is applied to the strap assembly. Such forces may disrupt the position of the ladder assembly and the support structure, thereby undermining the stability of the tree stand. In contrast, the strap assembly described herein is free from contact with the ladder assembly, which eliminates the application of any force to the ladder assembly during closure of the jaw assembly, thereby reducing (if not entirely preventing) unwanted movement of the ladder assembly.

Figure 1:
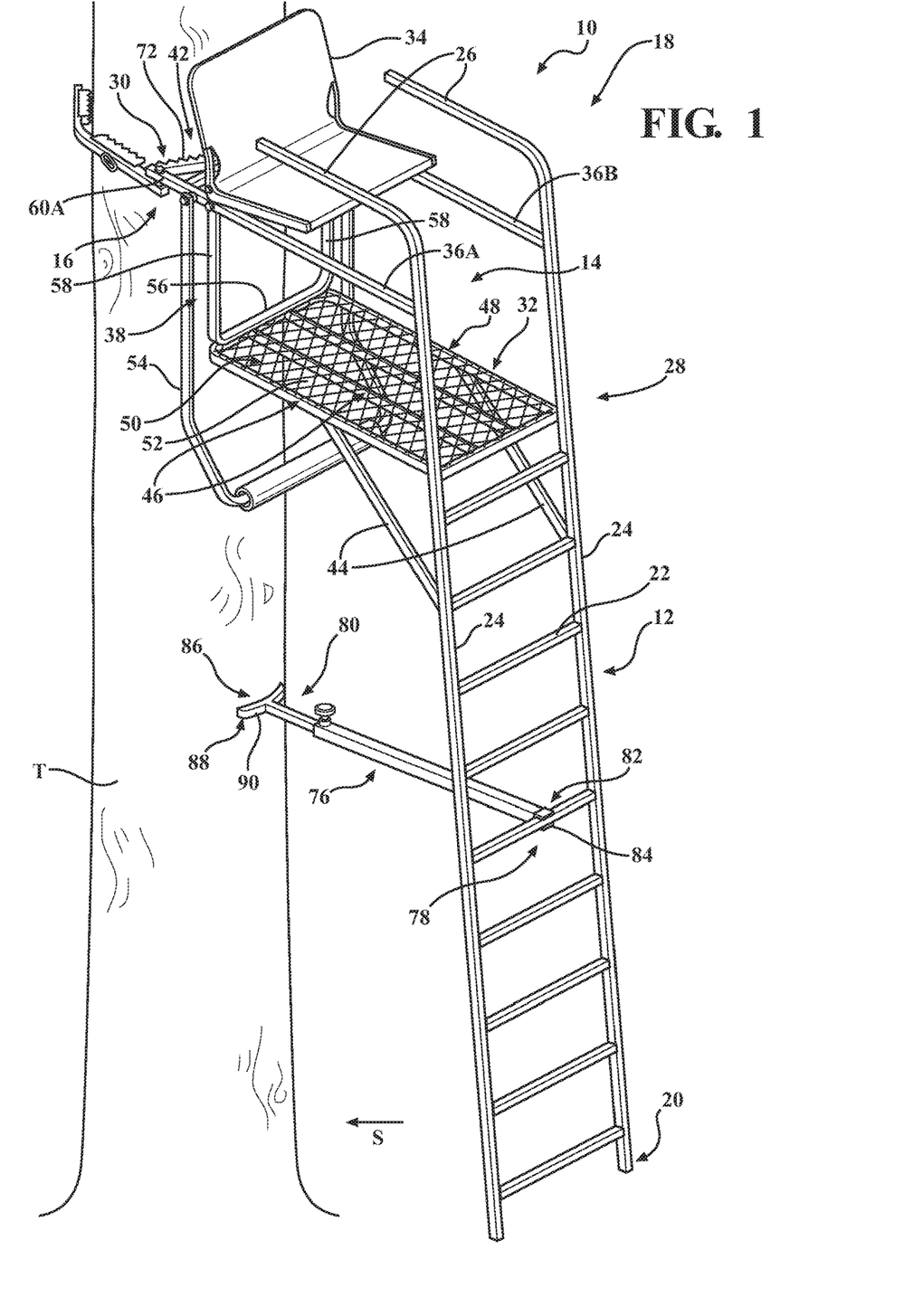
FIG. 1 is a front, perspective view of a tree stand in accordance with the principles of the present disclosure, which includes a ladder assembly; a support structure (e.g., for one or more occupants of the tree stand); a jaw assembly with first and second jaws; and an (optional) standoff bracket that is configured to support the ladder assembly.
Figure 2:
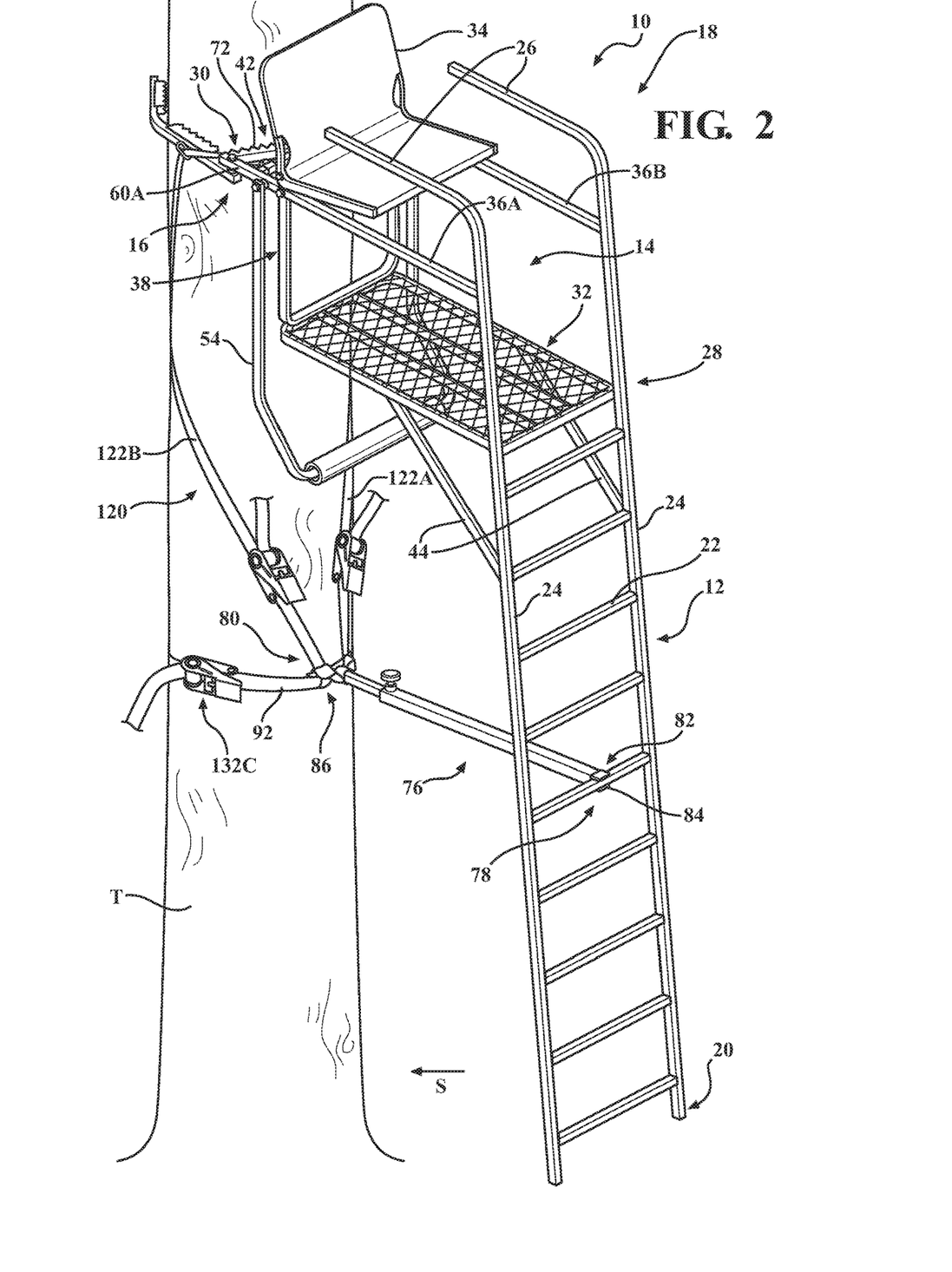
FIG. 2 is a front, perspective view of the tree stand seen in FIG. 1 shown with a strap assembly that is used to close the jaw assembly and secure the tree stand to the tree.

FIGS. 1-5 illustrate a ladder tree stand 10 for use in supporting one or more occupants (users) (not shown) at an elevated position in a tree T. The ladder tree stand 10 includes a ladder assembly 12, a support structure 14 connected to the ladder assembly 12 which is configured to support the occupant(s) of the tree stand 10, and a securement mechanism 16. The ladder tree stand 10 is configured to lean towards and against the tree T in a support direction S until the support structure 14 (or other portion of the tree stand 10) engages the tree T such that the ladder assembly 12 is supported in a generally upright and angular orientation, as seen in FIGS. 1 and 2.

The ladder assembly 12 includes an upper (top) end portion 18 that is connected to the support structure 14 to support the support structure 14 and thus, the occupant(s) in an elevated position in the tree T, and a lower (bottom) end portion 20 that is configured for engagement with the ground at a position spaced apart from a base of the tree T. In the illustrated embodiment, the ladder assembly 12 includes a series of rungs 22 that extend laterally between two vertical legs (rails) 24. At the upper end portion 18, it is envisioned that the legs 24 may extend towards the tree T so as to define a pair of arm rests 26. It should be appreciated, however, that the particular configuration of the ladder assembly 12 may be varied in alternate embodiments of the disclosure. For example, it is envisioned that the ladder assembly 12 may include a single leg 24 only, and that the rungs 22 may extend laterally outward in opposing directions from the leg 24. It is further envisioned that the ladder assembly 12 may be fully assembled, or that the ladder assembly 12 may include two or more connectable and disconnectable sections (e.g., to facilitate assembly, breakdown, transport, storage, etc., of the ladder assembly 12).

The support structure 14 includes a front (first) end portion 28 that is connected to the upper end portion 18 of the ladder assembly 12, and a rear (second) end portion 30 that is configured for engagement (or other such contact) with the tree T, as will be described in further detail below. The support structure 14 also includes a platform 32, a seat 34, side rails 36A, 36B, a generally U-shaped support 38, a crossbar 40, and a brace 42.

Figure 3:
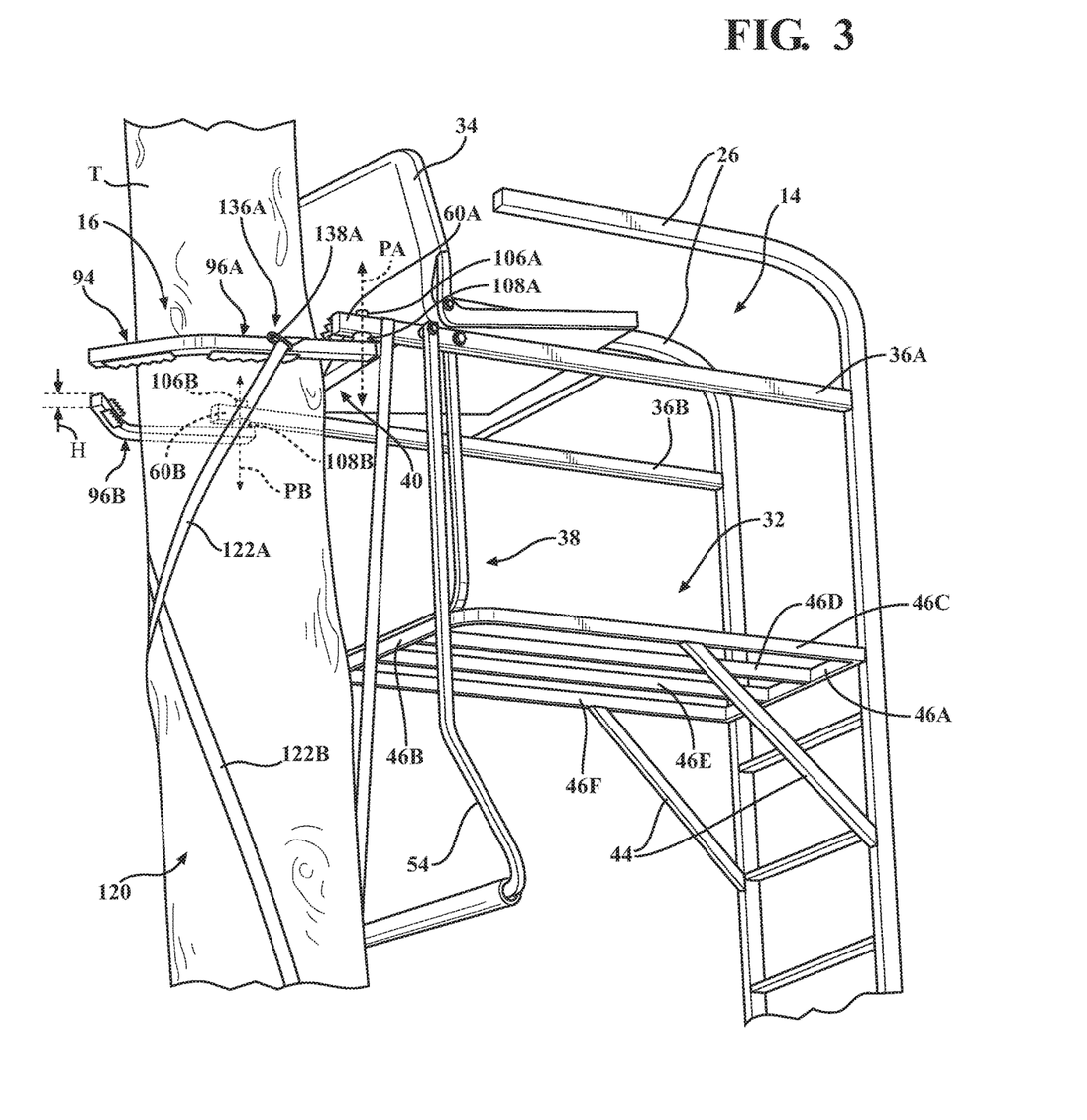
FIG. 3 is a partial, side, perspective view of the tree stand illustrating use of the strap assembly to close the jaw assembly around the tree.

The platform 32 is supported in an elevated (generally horizontal) position by a pair of angular support members 44 that extend between the platform 32 and the legs 24 of the ladder assembly 12. In the illustrated embodiment, the platform 32 is generally rectangular in configuration and includes a series of segments 46 and a floor 48 (FIG. 1) that is supported by the segments 46 (FIGS. 1, 3). More specifically, the platform 32 includes a pair of end segments 46A, 46B that extend in a first direction (in generally parallel relation to each other) and interconnecting segments 46C-46F that extend in a second direction (in generally parallel relation to each other). Although the segments 46A, 46B are illustrated as extending in generally orthogonal relation to the segments 46C-46F in the particular embodiment shown throughout the figures, in alternate embodiments of the disclosure, it is envisioned that one or more of the segments 46C-46F may extend in relation to one or more of the segments 46A, 46B so as to subtend an acute angle therebetween (e.g., one or more of the segments 46C-46F may extend in cross-wise or diagonal fashion). Additionally, although the platform 32 is shown as including six segments 46 in total, in various embodiments of the disclosure, it is envisioned that the particular number of segments 46 may be varied.

The floor 48 of the platform 32 may be configured in any manner suitable for the intended purpose of supporting the occupant(s) (not shown) of the ladder tree stand 10. Although generally shown as including a mesh 50 (FIG. 1) defining openings 52 (e.g., to reduce the overall weight of the platform 32, to allow fluids to drain through the platform 32, etc.), in alternate embodiments of the disclosure, it is envisioned that the floor 48 of the platform 32 may be solid in construction.

The seat 34 is mounted on (or is otherwise secured to) the side rails 36A, 36B, which extend from the legs 24 of the ladder assembly (at the upper end portion 18 thereof) towards the tree T in generally parallel relation to each other. In certain embodiments of the disclosure, however, it is envisioned that the seat 34 may be eliminated to create additional standing room on the platform 32, and/or that other structures, such as a shooting rest 54, may be mounted on (or otherwise secured to) the support structure 14. For example, the shooting rest 54 may be connected to the platform 32, to the seat 34, or, as shown in FIGS. 1-3, the shooting rest 54 may be connected to the side rails 36A, 36B such that the shooting rest 54 is pivotable, rotatable, or otherwise movable (e.g., prior to positioning the ladder tree stand 10 against the tree T) between a stored (inactive) position (shown throughout the figures), and a shooting (active) position, in which the shooting rest 54 rests upon the arm rests 26, the occupants lap, etc.

While the platform 32 and the seat 34 are illustrated somewhat generically throughout the figures in the interest of simplicity, it should be appreciated that the particular configuration, dimensions, orientation, etc., of the platform 32 and/or the seat 34 may be altered in various embodiments of the disclosure. For example, it is envisioned that the platform 32 may include one or more levels (terraces), that the seat 34 may be foldable or fixed in configuration, that the seat 34 may include a backrest, etc.

The side rails 36A, 36B are pivotally connected to the securement mechanism 16, and support the crossbar 40 and the brace 42, as described in further detail below. Although illustrated as being generally linear, tubular members throughout the figures, it should be appreciated that the particular configuration of the side rails 36A, 36B may be varied in alternate embodiments of the disclosure. Additionally, it is envisioned that the side rails 36A, 36B may be solid in construction, or, alternatively, that the side rails 36A, 36B may be hollow (e.g., to reduce the overall weight of the ladder tree stand 10).

The support 38 includes a bridge (base) 56 (FIG. 1) that is connected to the platform 32 (e.g., via welding, through the use of mechanical fasteners, etc.), and a pair of legs 58 that extend from the bridge 56 so as to define the generally U-shaped configuration shown throughout the figures. More specifically, the legs 58 extend upwardly (away from the platform 32) in a generally vertical orientation towards the side rails 36A, 36B so as to support the side rails 36A, 36B, and, thus, the seat 34. As shown throughout the figures, it is envisioned that the legs 58 of the support 38 may be connected to the side rails 36A, 36B through the use of one or more mechanical fasteners (e.g., bolts) that extend through the side rails 36A, 36B into engagement with the legs 58 so as to secure the support 38 and the side rails 36A, 36B together. Additionally, or alternatively, it is envisioned that the support 38 and the side rails 36A, 36B may be welded together. As can be appreciated through reference to the figures, the side rails 36A, 36B, the support 38, and the angular support members 44 collectively reinforce the platform 32 and the seat 34 to support the weight of the occupant(s) of the ladder tree stand 10.

With continued reference to FIGS. 1-5, the crossbar 40 and the brace 42 will be discussed. The crossbar 40 is generally linear in configuration, and extends (in a generally horizonal orientation) between respective end portions 60A, 60B (FIGS. 4, 5) of the side rails 36A, 36B (e.g., so as to enhance lateral stability of the support structure 14). It is envisioned that the crossbar 40 may be connected to the side rails 36A, 36B in any suitable manner, such as, for example, via welding (as shown throughout the figures), or through the use of one or more mechanical fasteners.

The brace 42 also extends between the respective end portions 60A, 60B (FIGS. 4, 5) of the side rails 36A, 36B (e.g., so as to further enhance lateral stability of the support structure 14), and includes a first segment 62A including an upper portion 64Au and a lower portion 64Al, and a second segment 62B including an upper portion 64Bu and a lower portion 64Bl. The segments 62A, 62B are arranged such that the brace 42 includes a generally V-shaped configuration. More specifically, the segments 62A, 62B intersect at a vertex 66 that is positioned generally adjacent to the crossbar 40, whereby the brace 42 is positioned rearwardly of the crossbar 40 (i.e., closer to the tree T). In various embodiments of the disclosure, it is envisioned that the brace 42 may be separated from the crossbar 40, or, alternatively, that the brace 42 may be connected to the crossbar 40 (e.g., via welding of the vertex 66 to the crossbar 40). In such embodiments, to facilitate connection of the brace 42 to the crossbar 40, it is envisioned that the vertex 66 may define a generally planar contact section that extends in generally parallel relation to a corresponding outer surface of the crossbar 40.

The V-shaped configuration of the brace 42 defines a receiving space 68 that is configured to receive the tree T so as to inhibit relative movement between the support structure 14 and the tree T. To further enhance engagement between the tree T and the brace 42, it is envisioned that the segments 62A, 62B (e.g., the upper portions 64Au, 64Bu and the lower portions 64A1, 64B1), may include a series of gripping members 70. Although shown as including generally triangular teeth 72 in the illustrated embodiment, it is envisioned that the specific configuration of the gripping members 70 may be varied in alternate embodiments of the disclosure. For example, it is envisioned that the gripping members 70 may be arcuate in configuration, or, alternatively, that the gripping members 70 may be generally linear in configuration so as to defines spikes, barbs, or the like.

In the illustrated embodiment, the upper portion 64Au and the lower portion 64A1 of the first segment 62A are (vertically) separated from each other so as to define a (first) channel 74A therebetween, and the upper portion 64Bu and the lower portion 64B1 of the second segment 62B are (vertically) separated from each other so as to define a (second) channel 74B therebetween. It should be appreciated, however, that the channels 74A, 74B may be eliminated in alternate embodiments of the disclosure.

In certain embodiments, the tree stand 10 may also include an (optional) standoff bracket 76 to further stabilize the ladder tree stand 10 and/or facilitate additional securement of the ladder tree stand 10 in relation to the tree T. The standoff bracket 76 extends between the ladder assembly 12 and the tree T at a location between the support structure 14 and the ground and is configured to resist bowing (deflection) of the ladder assembly 12 inwardly towards the tree T under a load (e.g., the weight of the occupant(s)). More specifically, the standoff bracket 76 includes a front (first) end 78 that is configured to engage the ladder assembly 12 and a rear (second) end 80 that is configured to engage (or otherwise contact) the tree T. In the illustrated embodiment, the front end 78 of the standoff bracket 76 includes an engagement member 82 that is configured as a generally C-shaped collar 84 to promote secured engagement of the standoff bracket 76 with one of the rungs 22 of the ladder assembly 12, and the rear end 80 of the standoff bracket 76 is provided with an anchor 86 that includes a substantially arcuate foot 88 (e.g., a bracket 90) that engages the tree T. A strap 92 (FIG. 2) is connected to (or tied) to each end of the foot 88 and is extendable from the foot 88 around the tree T, which may be tightened/secured using any suitable mechanism, as described in further detail below. It should be appreciated that the particular configuration of the standoff bracket 76 (e.g., the configuration of the engagement member 82 and/or the foot 88) may be varied in alternate embodiments of the disclosure. For example, it is envisioned that the engagement member 82 may be configured instead to engage one or more of the legs 24 of the ladder assembly 12 and/or that the anchor 86 may include one or more mechanical fasteners or mechanisms (e.g., screws that thread into the tree, etc.) without departing from the scope of the present disclosure. Additionally, although shown as including the aforementioned strap 92, in alternate embodiments of the disclosure, the anchor 86 may instead include a chain, a rope, a cord, a bracket, etc.

With reference now to FIGS. 3-6, the securement mechanism 16 is configured to grip the tree T to secure the ladder tree stand 10 in the upright orientation as seen in FIGS. 1 and 2, for example. When engaged, the securement mechanism 16 restricts movement of the support structure 14 relative to the tree T (e.g., vertical movement of the support structure 14 and/or movement of the support structure 14 away from the tree T). Although shown in the figures as being an integral component of the ladder tree stand 10, in alternate embodiments of the disclosure, it is envisioned that the securement mechanism 16 may be provided as a separate component to allow for an existing (known) ladder tree stand (not shown) to be retrofit to include the securement mechanism 16.

Although illustrated as being positioned generally behind the seat 34 throughout the figures, it is envisioned that the specific position of the securement mechanism 16 may be varied in alternate embodiments of the disclosure (e.g., depending upon the presence or the position of the seat 34 and/or platform 32). For example, embodiments are envisioned in which the securement mechanism 16 may be positioned behind (and adjacent to) the platform 32, between the seat 34 and the platform 32, or in any other suitable location.

The securement mechanism 16 includes a jaw assembly 94 with opposing (first and second) jaws 96A, 96B that are pivotably mounted to the respective end portions 60A, 60B of the side rails 36A, 36B of the support structure 14. More specifically, in the illustrated embodiment, the jaws 96A, 96B are mounted to the side rails 36A, 36B beneath and generally adjacent to or behind the seat 34. The jaws 96A, 96B are pivotable in relation to the support structure 14 (e.g., to the respective side rails 36A, 36B) such that the jaw assembly 94 is movable between an open position (FIG. 4), in which the jaws 96A, 96B are separated from each other to define a receiving gap (space) 98 for the tree T, and a closed position (FIGS. 3, 5), in which the jaws 96A, 96B are approximated to close (or narrow) the gap 98. The jaws 96A, 96B are configured such that, when the jaw assembly 94 is in the open position, the tree T is received in the gap 98 as the ladder tree stand 10 is leaned toward the tree T in the support direction S (FIGS. 1, 2). When the jaw assembly 94 is in the closed position, however, the jaws 96A, 96B are positionable around the tree T (either partially or entirely) to inhibit (if not entirely prevent) movement of the ladder tree stand 10 in relation to the tree T (e.g., slipping, falling, etc.). For example, as illustrated throughout the figures, the jaws 96A, 96B may be configured and oriented to grip the tree T and hold the ladder tree stand 10 in place with respect to the tree T. Although shown and described as including the discrete jaws 96A, 96B discussed above throughout the present disclosure, in alternate embodiments, the securement mechanism 16 may include a variety of configurations suitable for the intended purpose of selectively engaging the tree T to secure the support structure 14 in the manner described herein.

The jaws 96A, 96B include respective (first and second) segments 100A, 102A and 100B, 102B (FIG. 4) that are each generally linear in configuration. More specifically, the segments 100, 102 of each jaw 96 extend along intersecting axes Xi, Xii, respectively, that subtend an angle $\alpha$ such that the segment 102 extends transversely in relation to the segment 100. Although the angle $\alpha$ is shown as being approximately 25° in the illustrated embodiment, in alternate embodiments of the disclosure, the configuration of the jaws 96A, 96B may be varied to achieve any suitable or desirable value for the angle $\alpha$. For example, it is envisioned that the jaws 96A, 96B may be configured such that the angle $\alpha$ lies substantially within the range of approximately 15° to approximately 45°, although values outside of this range would not be beyond the scope of the present disclosure.

Figure 4:
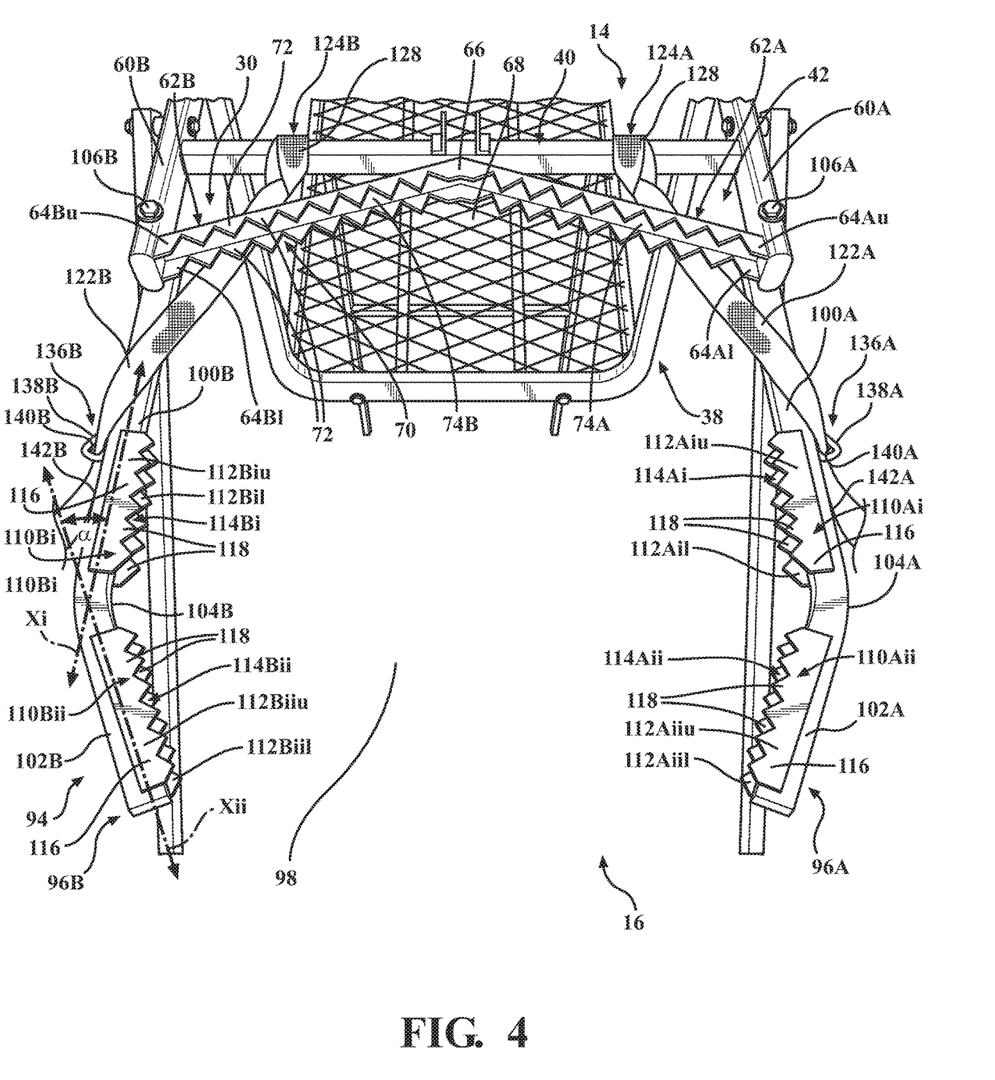
FIG. 4 is a top, perspective view of the strap assembly and the jaw assembly shown in an open position.

In the embodiment shown throughout the figures, the jaws 96A, 96B are unitary (e.g., monolithic) in construction, and each of the jaws 96A, 96B includes an intermediate segment 104 that extends between (and connects) the segments 100, 102. More specifically, the jaw 96A includes an intermediate segment 104A that extends between the segments 100A, 102A, and the jaw 96B includes an intermediate segment 104B that extends between the segments 100B, 102B. As seen in FIG. 4, for example, the intermediate segments 104A, 104B are each arcuate in configuration, and each define a radius of curvature that supports the orientation of the segments 100, 102 discussed above (i.e., the definition of the angle α). It should be appreciated, however, that the configuration (e.g., the curvature) of the intermediate segments 104A, 104B may be varied in alternate embodiments of the disclosure to achieve any suitable relative orientation of the segments 100A, 102A and the segments 100B, 102B. It is also envisioned that, in certain embodiments, the intermediate segments 104 may be eliminated, and that the segments 102 may be directly connected to the segments 100.

Figure 5:
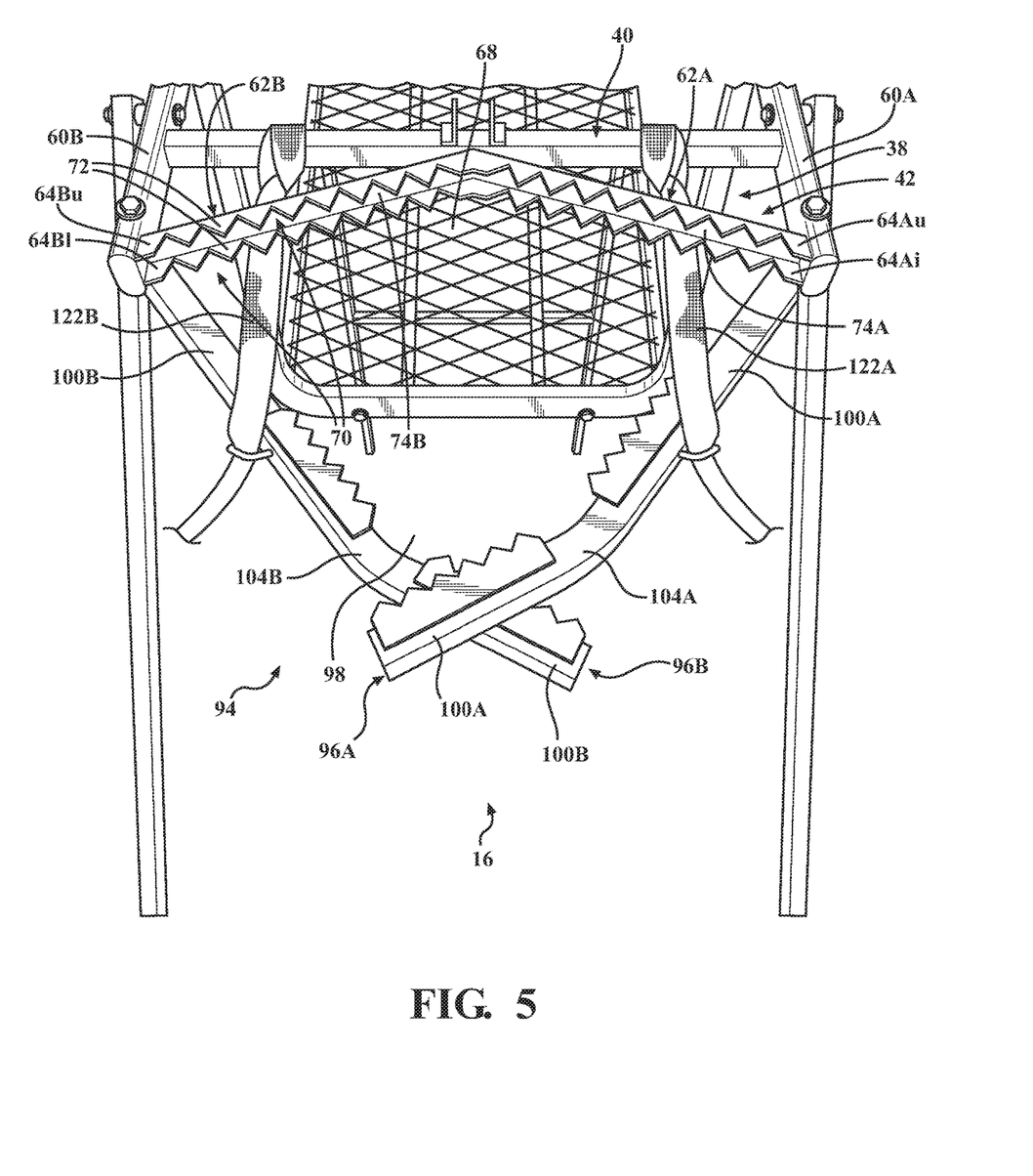
FIG. 5 is a top, perspective view of the strap assembly and the jaw assembly shown in a closed position.

The segments 100A, 100B are pivotably connected to the support structure 14 by having the open end of the segments 100A, 100B pivotally connected to the side rails 36A, 36B. It is envisioned that the segments 100A, 100B may be respectively connected to the side rails 36A, 36B in any suitable manner using any suitable component(s) and/or mechanism(s). For example, as seen in FIG. 5, the segment 100A of the jaw 96A is connected to the side rail 36A via a (first) fastener (e.g., bolt) 106A and a (first) spacer 108A defining a (first) pivot axis PA, and the segment 100B of the jaw 96B is connected to the side rail 36B via a (second) fastener (e.g., bolt) 106B and a (second) spacer 108B defining a (second) pivot axis PB.

To enhance engagement between the jaw assembly 94 and the tree T, it is envisioned that the jaws 96A, 96B may include a series of engagement members 110 (FIG. 4). For example, in the illustrated embodiment, the jaw 96A includes a first engagement member 110Ai that is positioned on the segment 100A and a second engagement member 110Aii that is positioned on the segment 102A, and the jaw 96B includes a first engagement member 110Bi that is positioned on the segment 100B and a second engagement member 110Bii that is positioned on the segment 102B. More specifically, the engagement member 110Ai includes respective upper and lower engagement portions 112Aiu, 112Ail defining a channel 114Ai therebetween, the engagement member 110Aii includes respective upper and lower engagement portions 112Aiiu, 112Aiil defining a channel 114Aii therebetween, the engagement member 110Bi includes respective upper and lower engagement portions 112Biu, 112Bil defining a channel 114Bi therebetween, and the engagement member 110Bii includes respective upper and lower engagement portions 112Biiu, 112Biil defining a channel 114Bii therebetween. As can be appreciated through reference to FIGS. 4 and 5 in particular, each of the engagement portions 112 is configured as a generally planar plate 116, which may be connected to the jaws 96 in any suitable manner, such as, for example, via welding (as shown throughout the figures), or through the use of one or more mechanical fasteners.

The engagement members 110Ai, 110Aii, 110Bi, 110Bii each include a series of teeth 118, and are configured as discrete structures. As a result, the teeth 118 extend discontinuously along the jaws 96A, 96B, which may inhibit (if not entirely prevent) interference or contact with the strap assembly (described herein below) used to close the jaw assembly 94, and, thus, fraying of the strap assembly. While the teeth 118 are shown as being generally triangular in configuration in the illustrated embodiment, it is envisioned that the specific configuration of the teeth 118 may be varied in alternate embodiments of the disclosure. For example, it is envisioned that the teeth 118 may be arcuate in configuration, or, alternatively, that the teeth 118 may be generally linear in configuration so as to defines spikes, barbs, or the like.

In an alternate embodiment of the disclosure (not shown), it is envisioned that the jaws 96 may each include a single engagement member 110 only. Additionally, it is envisioned that the engagement members 110 may be eliminated altogether and that the teeth 118 may be connected directly to (e.g., formed integrally with) the jaws 96.

In certain embodiments, it is envisioned that the jaws 96A, 96B may be connected to the support structure 14 at different vertical positions (heights) to allow the jaws 96A, 96B to overlap without interference as the jaw assembly 94 is moved into the closed position (FIGS. 3, 5), and thereby completely circumscribing the tree T. To facilitate such vertical spacing, it is envisioned that the spacer 108A (FIG. 3), which receives the fastener 106A, may define a first height, and that the second spacer 108B, which receives the fastener 106B, may define a second, different height. In such embodiments, the difference in the heights between the spacers 108A, 108B must be at least greater than a height (vertical dimension) H (FIG. 3) defined by the jaw 96B such that the jaw 96B passes beneath the jaw 96A (or greater than the height (vertical dimension) defined H by the jaw 96A such that the jaw 96A passes beneath the jaw 96B) as the jaw assembly 94 is moved into the closed position. It is also envisioned that by allowing the jaws 96A, 96B to overlap, the space required to store and/or transport the ladder tree stand 10 may be reduced.

With continued reference to FIGS. 1-6, the securement mechanism 16 further includes a strap assembly 120 that extends between the support structure 14 and the anchor 86. The strap assembly 120 is configured to apply a closure force to the jaw assembly 94 that is directed inwardly (i.e., towards the tree T) when tension is applied to the strap assembly 120 to thereby move the jaw assembly 94 from the open position (FIG. 4) to the closed position (FIGS. 3, 5), as described in further detail below.

The strap assembly 120 includes a (first) strap 122A that is configured for contact (engagement) with the (first) jaw 96A, and a (second) strap 122B that is configured for contact (engagement) with the (second) jaw 96B. The strap 122A includes an upper (first) end portion 124A (FIG. 4) that is secured to the crossbar 40 of the support structure 14 extending between the side rails 36A, 36B, and a lower (second) end portion 126A (FIG. 6) that is secured to the anchor 86 (either directly or indirectly), and the strap 122B includes an upper (first) end portion 124B that is secured to the crossbar 40, and a lower (second) end portion 126B that is secured to the anchor 86 (either directly or indirectly). In the particular embodiment shown throughout the figures, the upper end portions 124A, 124B of the straps 122A, 122B each include a loop 128, through which the lower end portions 126A, 126B of the straps 122A, 122B are fed through during attachment such that the straps 122A, 122B are self-secured to the crossbar 40, and the lower end portions 126A, 126B of the straps 122A, 122B are connected to the anchor 86 by one or more tensioning mechanisms 130. It should be appreciated, however, that the particular configurations of the respective end portions 124A, 126A, 124B, 126B of the straps 122A, 122B may be altered or varied in additional embodiments of the disclosure to facilitate their respective connections. For example, it is envisioned that the respective upper end portions 124A, 124B of the straps 122A, 122B may be connected to the crossbar 40 by clamps or other such mechanical mechanisms. Additionally, or alternatively, it is envisioned that the lower end portions 126A, 126B may be configured for direct connection to the anchor 86, and that the tensioning mechanism(s) 130 may be repositioned in any location suitable for the intended purpose of applying tension to the strap assembly 120 in the manner described herein.

In the illustrated embodiment, the tensioning mechanism 130 is illustrated as including a pair of ratcheting tensioners 132A, 132B (FIG. 6) that respectively connect the straps 122A, 122B to the anchor 86 via ratchet straps 134A, 134B. It should be appreciated, however, that the particular configuration of the tensioning mechanism 130 may be varied, and that other types of mechanisms or tension retainers may be used to apply and/or maintain tension in the straps 122A, 122B without departing from the scope of the present disclosure. By including separate tensioners 132A, 132B, tension can be independently applied to the straps 122A, 122B to facilitate independent closure of the jaws 96A, 96B.

As seen in FIGS. 4 and 5, the strap 122A is threaded through a (first) routing member 136A mounted on the jaw 96A, and the strap 122B is threaded through a (second) routing member 136B mounted on the jaw 96B. In the illustrated embodiment, the routing members 136A, 136B are configured as generally U-shaped brackets 138 defining channels 140 that are fixedly secured to respective outer (external) surfaces 142A, 142B of the jaws 96A, 96B (e.g., via welding, integral (monolithic) formation, etc.) such that the straps 122A, 122B apply an inwardly directed force to the jaws 96A, 96B upon the application of tension to the strap assembly 120 to squeeze or draw (push) the jaws 96A, 96B inwardly towards each other and the tree T (FIGS. 1, 2). The straps 122A, 122B are thus in direct contact (or engagement) with the jaws 96A, 96B, respectively, and are free from any engagement or contact with the ladder assembly 12. Alternatively, however, it is envisioned that the routing members 136A, 136B may be defined by the jaws 96A, 96B themselves, such as by openings (e.g., slits) (not shown), whereby the straps 122A, 122B may instead pass through the jaws 96A, 96B for contact with inner surfaces of the jaws 96A, 96B defined by the openings.

Although the routing members 136A, 136B are shown as being connected to the first segments 100A, 100B of the jaws 96A, 96B, respectively, it should be appreciated that the particular location of the routing members 136A, 136B may be varied in alternate embodiments of the disclosure. For example, it is envisioned instead that the routing members 136A, 136B may be connected to the second segments 102A, 102B of the jaws 96A, 96B, respectively. In such embodiments, by increasing the spacing between the routing members 136A, 136B and the pivot axes PA, PB (FIG. 3), it is envisioned that leverage may be increased to reduce the tension required to close the jaw assembly 94 and secure the ladder tree stand 10 to the tree T.

Figure 7:
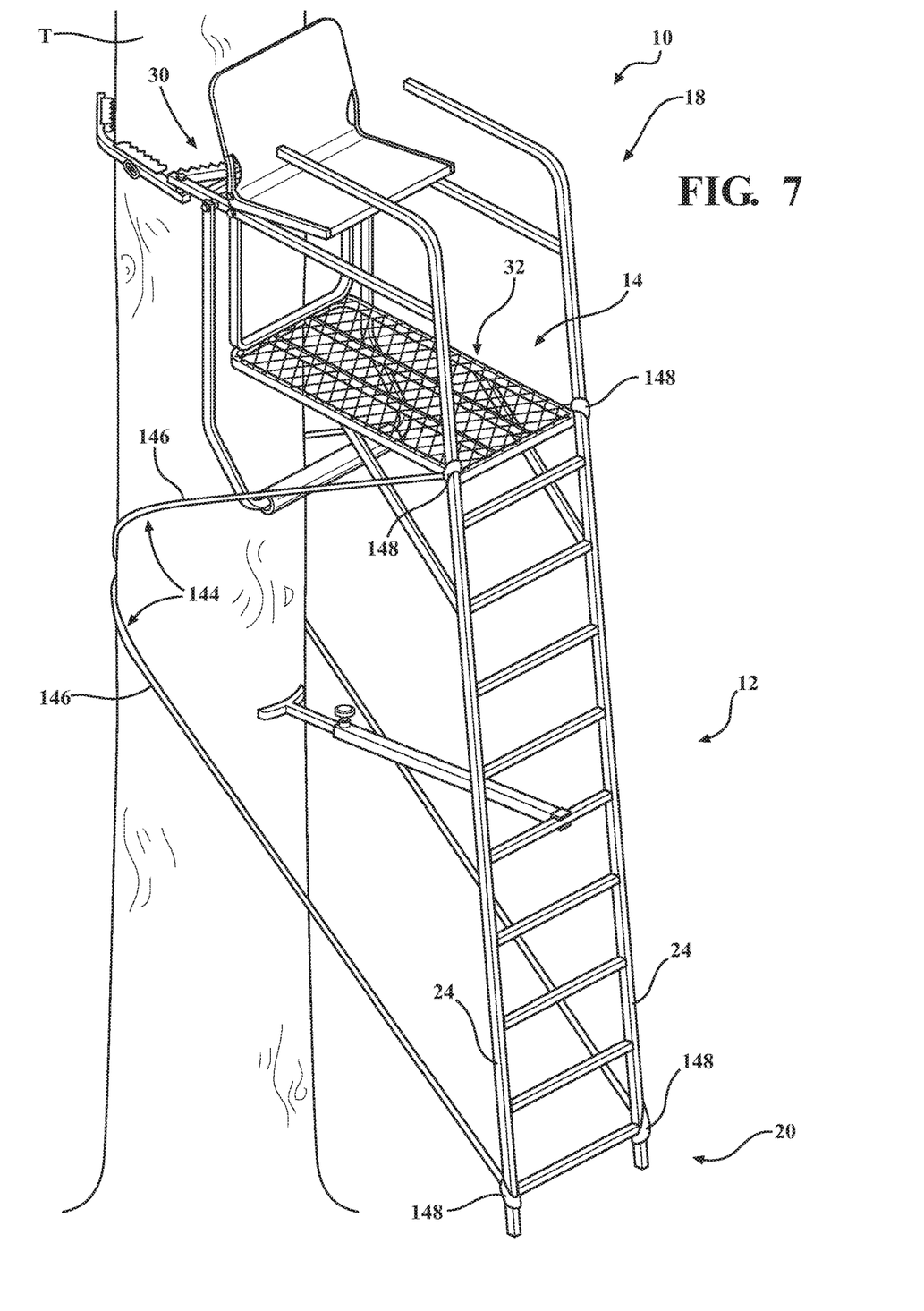
FIG. 7 is a front, perspective view of an alternate embodiment of the tree stand seen in FIG. 1, which includes a series of retention members to further stabilize and secure the tree stand.

As seen in FIG. 7, in certain embodiments, the ladder tree stand 10 may further include a series of retention members 144 (e.g., straps 146) to further stabilize and secure the ladder tree stand 10 in relation to the tree T. In the illustrated embodiment, the retention members 144 extend from the upper end portion 18 of the ladder assembly 12, or from the support structure 14 (e.g., the platform 32), around and behind the tree T (i.e., on a surface of the tree T generally opposite the rear end portion 30 of the support structure 14) in crosswise, overlapping fashion, to the lower end portion 20 of the ladder assembly 12. The retention members 144 may be configured for connection to the ladder assembly 12 (or the support structure 14) in any suitable manner. For example, as seen in FIG. 7, the retention members 144 may include loops 148 or other such suitable connectors.

With reference now to FIGS. 1-7, placement and use of the ladder tree stand 10 will be discussed. Initially, the securement mechanism 16 is readied by threading the straps 122A, 122B through the channels 140 (FIG. 4) defined by the respective routing members 136A, 136B on the jaws 96A, 96B. Either prior or subsequent thereto, the ladder tree stand 10 is positioned by orienting the standoff bracket 76 (FIGS. 1, 2, 6) between the ladder assembly 12 and the tree T. With the jaw assembly 94 in the open position (FIG. 4), the ladder tree stand 10 is leaned in the support direction S towards the tree T such that the tree T is received within the gap 98 between the open jaws 96A, 96B, and the rear end portion 30 (FIGS. 1, 2, 4) of the support structure 14 (e.g., the brace 42) engages the tree T. The anchor 86 is then secured to the tree T (e.g., via a ratcheting tensioner 132C (FIG. 2), to stabilize the ladder assembly 12. For example, the anchor 86 may be positioned near the ground to allow a user to access the strap assembly 120 and the tensioning mechanism 130 while the user is standing on the ground.

In embodiments of the ladder tree stand 10 including the aforementioned retention members 144 (FIG. 7), the retention members 144 may be attached to the ladder assembly 12 (and/or the support structure 14) before the ladder tree stand 10 is positioned against the tree T. In such embodiments, the retention members 144 are allowed to hang vertically downward, and are arranged in overlapping, crosswise relation behind the tree T, as seen in FIG. 7. The retention members 144 can then be connected to the lower end portion 20 of the ladder assembly 12 (e.g., about the legs 24).

Figure 6:
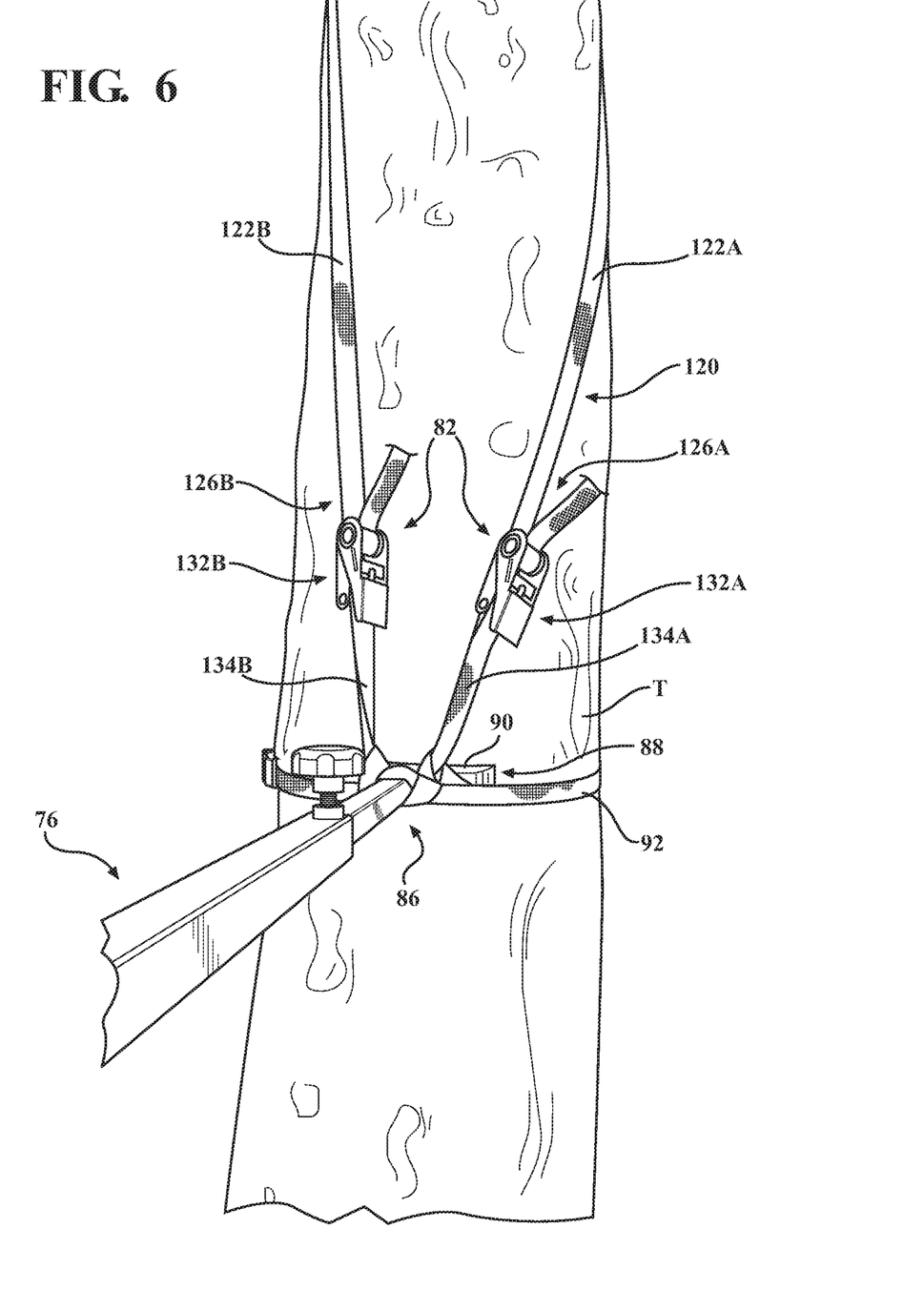
FIG. 6 is a partial, front view illustrating connection of the strap assembly to an anchor secured to the tree.

Following the secured placement of the anchor 86, the straps 122A, 122B are arranged in overlapping, crosswise relation behind the tree T, as seen in FIGS. 3 and 6, for example, and the straps 122A, 122B are connected to the anchor 86 via the tensioning mechanism 130. More specifically, the lower end portion 126A (FIG. 6) of the strap 122A is connected to the tensioner 132A, and the lower end portion 126B of the strap 122B is connected to the tensioner 132B. The tensioners 132A, 132B are then utilized to apply tension to the straps 122A, 122B, respectively, whereby the strap 122B applies an inwardly directed force to the outer surface 142B of the jaw 96B, and the strap 122A applies an inwardly directed force to the outer surface 142A of the jaw 96A to close the jaw assembly 94 around the tree T. The jaws 96A, 96B are thus squeezed or drawn together by the strap assembly 120, as opposed to being pulled together. It is envisioned that independent operation of the tensioners 132A, 132B, and thus, independent closure of the jaws 96A, 96B may provide certain advantages, particularly in the context of a tree T with an irregular shape (e.g., a tree T with one side that extends further outward from an axis centered between, and perpendicular to, the pivot axes PA, PB (FIG. 3) than an opposite side of the tree T).

During closure of the jaw assembly 94, side portions of the tree T are clamped between the segments 100A, 100B (FIGS. 4, 5) of the jaws 96A, 96B, and the front and rear portions of the tree T are clamped between the rear end portion 30 of the support structure 14 and the segments 102A, 102B of the jaws 96A, 96B, respectively. As tension is applied to the straps 122A, 122b during closure of the jaw assembly 94, the straps 122A, 122B are allowed to move in relation to the jaws 96A, 96B through the routing members 136A, 136B and across the outer surfaces 142A, 142B thereof, respectively.

The presently described securement mechanism 16 offers several advantages over certain known designs. For example, the securement mechanism 16 allows a user to close the jaws 96A, 96B around the tree T before ascending the ladder assembly 12 and prevents damage to the tree stand 10 by closing the jaws 96A, 96B via tension imparted upon the tree T, rather than upon the ladder tree stand 10 itself. In addition, as mentioned above, when used with a tree T that is irregularly shaped, the configuration of the jaw assembly 94 facilitates independent gripping engagement of the jaws 96A, 96B with the tree T.

Since the securement mechanism 16 operates via engagement of the jaws 96A, 96B with the tree T, likewise anchoring the strap assembly 120 to the tree T may provide advantages when compared to other potential anchor locations given the potentially significant forces experienced during tensioning. Were the strap assembly 120 to be anchored to the ladder tree stand 10 itself (e.g., the ladder assembly 12), deformation or buckling could occur that could potentially compromise the stability of the ladder tree stand 10. Moreover, were the tree stand 10 to sustain damage at or near an anchor point on the ladder tree stand 10 itself, tension in the strap assembly 120 could be lost, which could result in reduced grip on the tree T. By anchoring the strap assembly 120 directly to the tree T via the anchor 86, the likelihood of any such potentialities may be reduced.

As discussed above, the securement mechanism 16 may be preinstalled on the ladder tree stand 10, or the securement mechanism 16 may be provided separately to allow for the retrofit application of the securement mechanism 16 to an existing tree stand. For such retrofit applications, before using the tree stand 10, the securement mechanism 16 can be installed, which may require the formation of holes in the corresponding support structure on the existing tree stand for receipt of the fasteners 106A, 106B (FIG. 4).

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure, and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" (and variations thereof) with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately," "generally," and "substantially" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A tree stand for use in supporting an occupant in an elevated position in a tree, the tree stand comprising:
    a ladder assembly;
    a support structure secured to the ladder assembly and configured to support the occupant of the tree stand;
    a jaw assembly including first and second jaws directly and pivotally secured to the support structure such that each of the first and second jaws is inwardly movable to close the jaw assembly;
    a strap assembly including first and second straps, the first strap extending from the support structure and laterally outward of the first jaw such that the first strap slidably engages an outermost lateral surface of the first jaw, and the second strap extending from the support structure and laterally outward of the second jaw such that the second strap slidably engages an outermost lateral surface of the second jaw; and
    an anchor securable to the tree, the strap assembly being connectable to the anchor such that the first and second straps are free from contact with the ladder assembly and are arranged in overlapping, crosswise relation behind the tree, whereby a tensioning force applied to the strap assembly forces the first and second jaws inwardly towards the tree.

2. The tree stand of claim 1, wherein the support structure includes a platform, and a seat supported by the platform.

3. The tree stand of claim 1, wherein the first jaw includes a first strap routing member configured to receive the first strap such that the first strap extends from the support structure through the first strap routing member, and the second jaw includes a second strap routing member configured to receive the second strap such that the second strap extends from the support structure through the second strap routing member.

4. The tree stand of claim 1, wherein the first and second jaws each include a first linear segment pivotally secured to the support structure, and a second linear segment that extends transversely in relation to the first linear segment, the first strap routing member being fixedly secured to the first linear segment of the first jaw and the second strap routing member being fixedly secured to the first linear segment of the second jaw.

5. The tree stand of claim 4, wherein the first and second jaws each include an arcuate segment extending between the first and second linear segments.

6. The tree stand of claim 5, wherein the first and second jaws are each unitary in construction.

7. The tree stand of claim 3, further including a standoff bracket having a first end configured for engagement with the ladder assembly, and a second end configured for engagement with the tree, the standoff bracket being configured to support the ladder assembly to inhibit bowing of the ladder assembly towards the tree under a load.

8. The tree stand of claim 7, wherein the anchor is configured for engagement with the standoff bracket.

9. The tree stand of claim 8, wherein the anchor is configured as a strap that is extendable from the second end of the standoff bracket such that the anchor is circumscribable about the tree.

10. A tree stand comprising:
a ladder assembly;
a support structure secured to the ladder assembly and configured to support an occupant in an elevated position in a tree;
a strap assembly including first and second straps directly secured to the support structure;
a jaw assembly including first and second jaws pivotally secured to the support structure, wherein the first strap extends about the first jaw in direct contact with an outermost lateral surface thereof and the second strap extends about the second jaw in direct contact with an outermost lateral surface thereof; and
an anchor securable to the tree, the strap assembly extending between the support structure and the anchor such that the first and second straps are free from engagement with the ladder assembly, wherein the first strap contacts the first jaw to apply an inwardly directed force thereto and the second strap contacts the second jaw to apply an inwardly directed force thereto.

11. The tree stand of claim 10, wherein the first and second straps are arrangeable in overlapping, crosswise relation behind the tree such that, upon application of a tensioning force to the strap assembly, the strap assembly pushes the first and second jaws inwardly towards the tree.

12. The tree stand of claim 11, wherein the first jaw includes a first strap routing member configured to receive the first strap such that the first strap is in direct contact with the first jaw, and the second jaw includes a second strap routing member configured to receive the second strap such that the second strap is in direct contact with the second jaw, the first and second straps being movable in relation to the first and second jaws upon application of the tensioning force.

13. The tree stand of claim 12, wherein the first and second jaws are each unitary in construction.

14. The tree stand of claim 12, further including a standoff bracket having a first end configured for engagement with the ladder assembly, and a second end configured for engagement with the tree, the standoff bracket being configured to support the ladder assembly to inhibit bowing of the ladder assembly towards the tree under a load.

15. The tree stand of claim 14, wherein the anchor is configured for engagement with the standoff bracket.

16. A tree stand comprising:
a ladder assembly;
an anchor extending from the ladder assembly;
a support structure secured to the ladder assembly and configured to support an occupant of the tree stand;
a jaw assembly directly and pivotally secured to the support structure such that the jaw assembly is movable between an open position and a closed position; and
a strap assembly having a first section secured to the support structure and a second section secured to the anchor such that the strap assembly is free from engagement with the ladder assembly, the strap assembly extending into slidable engagement with outermost lateral surfaces of the jaw assembly such that tension applied to the strap assembly applies an inwardly directed force to the jaw assembly to move the jaw assembly from the open position to the closed position.

17. The tree stand of claim 16, wherein the jaw assembly includes first and second jaws pivotally secured to the support structure.

18. The tree stand of claim 17, wherein the strap assembly includes a first strap extending into slidable engagement with the first jaw and a second strap extending into slidable engagement with the second jaw.

* * * * *